(12) United States Patent
Kato et al.

(10) Patent No.: US 11,374,426 B2
(45) Date of Patent: Jun. 28, 2022

(54) VEHICLE INCLUDING A CONTACTLESS CHARGER

(71) Applicant: SUBARU CORPORATION, Tokyo (JP)

(72) Inventors: Takuma Kato, Tokyo (JP); Fumiyuki Moriya, Tokyo (JP); Masakazu Yoshino, tokyo (JP)

(73) Assignee: SUBARU CORPORATION, Tokyo (JP)

( * ) Notice: Subject to any disclaimer, the term of this patent is extended or adjusted under 35 U.S.C. 154(b) by 128 days.

(21) Appl. No.: 16/837,244

(22) Filed: Apr. 1, 2020

(65) Prior Publication Data

US 2020/0373780 A1    Nov. 26, 2020

(30) Foreign Application Priority Data

May 22, 2019    (JP) .............................. JP2019-095853

(51) Int. Cl.
| | |
|---|---|
| *H02J 7/00* | (2006.01) |
| *H02J 7/02* | (2016.01) |
| *B60R 16/03* | (2006.01) |
| *H02J 50/90* | (2016.01) |
| *H02J 50/10* | (2016.01) |

(52) U.S. Cl.
CPC ............... *H02J 7/02* (2013.01); *B60R 16/03* (2013.01); *H02J 7/0047* (2013.01); *H02J 50/10* (2016.02); *H02J 50/90* (2016.02)

(58) Field of Classification Search
CPC .. H02J 7/02; H02J 7/0047; H02J 50/90; H02J 50/10

USPC ........................................................ 320/108
See application file for complete search history.

(56) References Cited

U.S. PATENT DOCUMENTS

| | | | | |
|---|---|---|---|---|
| 2012/0043931 | A1* | 2/2012 | Terao ...................... | H02J 50/90 320/108 |
| 2013/0038280 | A1* | 2/2013 | Boundy ................ | H02J 7/0044 320/108 |
| 2013/0234662 | A1* | 9/2013 | Nakayama .............. | H01F 38/14 320/108 |
| 2016/0164335 | A1* | 6/2016 | Kanahara ................ | H02J 50/90 320/108 |
| 2017/0085118 | A1* | 3/2017 | Kim ........................ | H02J 50/10 |

(Continued)

FOREIGN PATENT DOCUMENTS

JP            2014-193070 A      10/2014

*Primary Examiner* — Suchin Parihar
(74) *Attorney, Agent, or Firm* — McGinn I.P. Law Group, PLLC.

(57) ABSTRACT

A vehicle in which a contactless charger is installable, the contactless charger being capable of performing wireless charging of a mobile device. The vehicle includes a traveling controller and a device managing unit. The traveling controller is configured to perform at least traveling control of first traveling characteristics and traveling control of second traveling characteristics. The second traveling characteristics are traveling characteristics in which behavior of the vehicle is gentler than that in the first traveling characteristics. The device managing unit is configured to switch the contactless charger between a charging-capable state and a non-working state. When the device managing unit switches the contactless charger to the charging-capable state, the traveling controller changes traveling characteristics to the second traveling characteristics.

20 Claims, 5 Drawing Sheets

(56) References Cited

U.S. PATENT DOCUMENTS

| | | | |
|---|---|---|---|
| 2018/0088186 A1* | 3/2018 | Bhattacharyya | G01B 7/14 |
| 2020/0271747 A1* | 8/2020 | Wu | G01P 15/18 |
| 2021/0083723 A1* | 3/2021 | Yoshino | H02J 7/0044 |

* cited by examiner

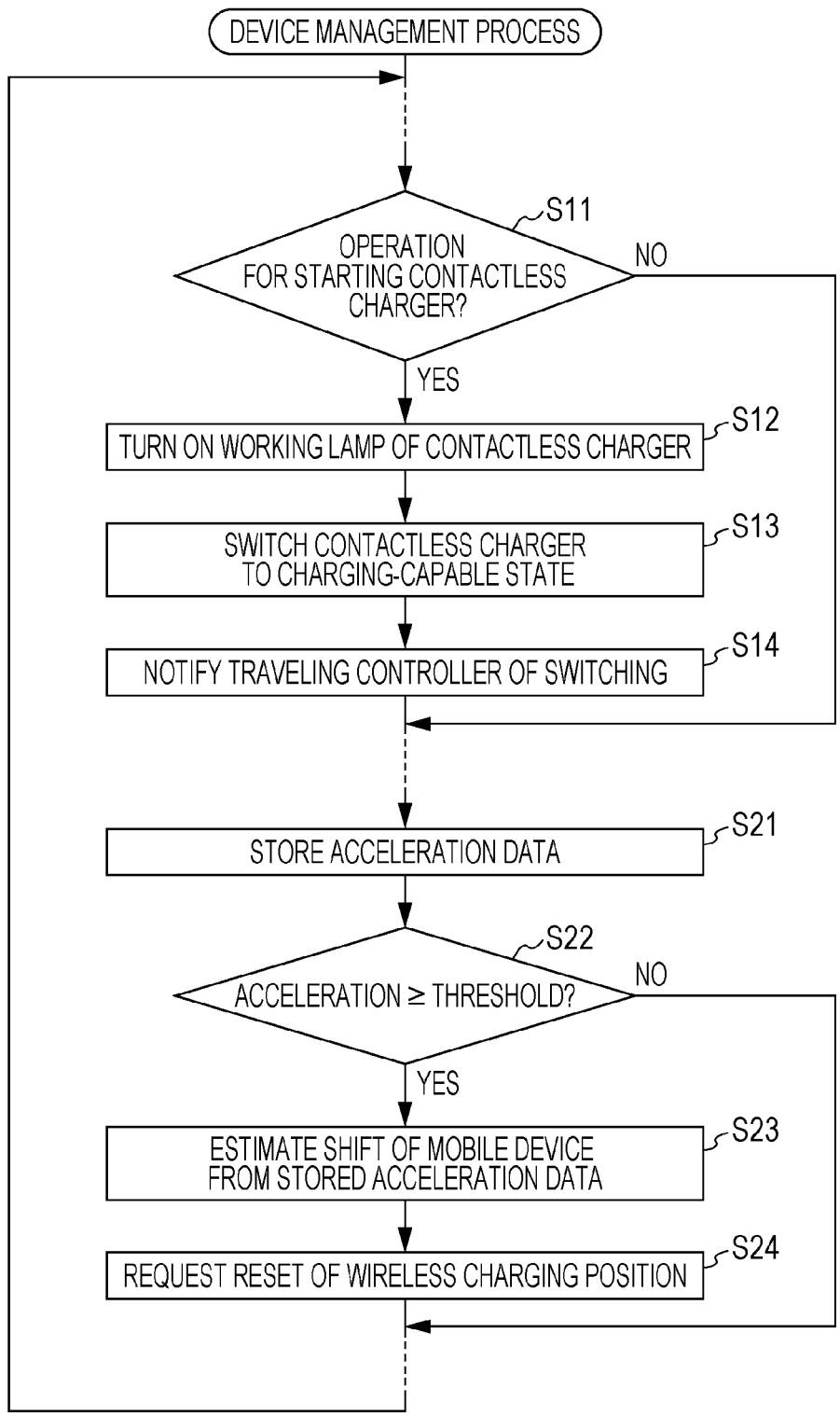

VEHICLE INCLUDING A CONTACTLESS CHARGER

CROSS-REFERENCE TO RELATED APPLICATIONS

The present application claims priority from Japanese Patent Application No. 2019-095853 filed on May 22, 2019, the entire contents of which are hereby incorporated by reference.

BACKGROUND

The disclosure relates to a vehicle in which a contactless charger is installable, the contactless charger being capable of performing wireless charging of a mobile device.

In the related art, a contactless charger may be installed near a driver's seat in a vehicle cabin. When a mobile device is placed on a plate of the contactless charger, the mobile device can be charged wirelessly. Japanese Unexamined Patent Application Publication (JP-A) No. 2014-193070 discloses a contactless charger. If a mobile device slips by an inertial force generated by acceleration or the like while the mobile device is being charged wirelessly during traveling, the contactless charger estimates a slip direction and resets a charging position.

SUMMARY

An aspect of the disclosure provides a vehicle in which a contactless charger is installable. The contactless charger is capable of performing wireless charging of a mobile device. The vehicle includes a traveling controller and a device managing unit. The traveling controller is configured to perform at least traveling control of first traveling characteristics and traveling control of second traveling characteristics. The second traveling characteristics are traveling characteristics in which behavior of the vehicle is gentler than that in the first traveling characteristics. The device managing unit is configured to switch the contactless charger between a charging-capable state and a non-working state. When the device managing unit switches the contactless charger to the charging-capable state, the traveling controller changes traveling characteristics to the second traveling characteristics.

A second aspect of the disclosure provides a vehicle in which a contactless charger is installable. The contactless charger is capable of performing wireless charging of a mobile device. The vehicle includes circuitry. The circuitry is configured to perform at least traveling control of first traveling characteristics and traveling control of second traveling characteristics. The second traveling characteristics are traveling characteristics in which behavior of the vehicle is gentler than that in the first traveling characteristics. The circuitry is configured to switch the contactless charger between a charging-capable state and a non-working state. The circuitry is configured to change traveling characteristics to the second traveling characteristics when the contactless charger is switched to the charging-capable state.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 4 is a flowchart illustrating a device management process performed by a device managing unit; FIG. 5A illustrates an example of acceleration data and FIG. 5B illustrates an example of resetting a charging position corresponding to shift of the mobile device.

DETAILED DESCRIPTION

As illustrated in JP-A No. 2014-193070, while a mobile device is being charged wirelessly by a contactless charger installed in a vehicle, if the vehicle exhibits sudden behavior, the mobile device may slip on a plate, hindering smooth charging.

It is desirable to provide a vehicle that, if a contactless charger is installed therein, can encourage smooth charging of a mobile device.

Figure 1:
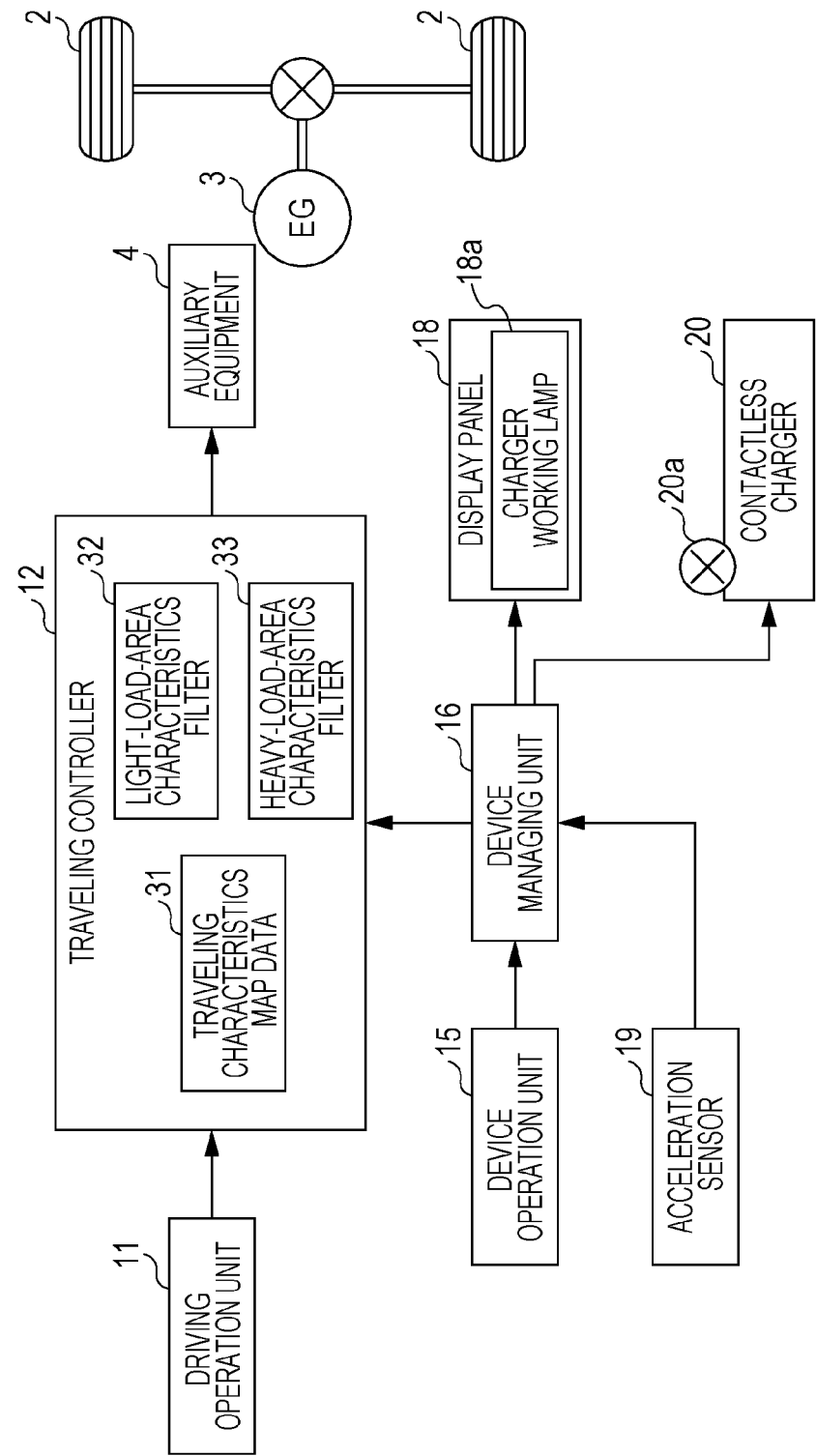
FIG. 1 is a block diagram illustrating a vehicle according to an embodiment of the disclosure.

Hereinafter, an embodiment of the disclosure will be described in detail with reference to the drawings. FIG. 1 is a block diagram illustrating a vehicle according to the embodiment of the disclosure.

A vehicle 1 according to the embodiment is an automobile, such as an engine car, and may be an electric vehicle (EV), a hybrid electric vehicle (HEV), or the like. The vehicle 1 includes driving wheels 2, an engine 3 that generates power for the driving wheels 2, auxiliary equipment 4 that drives the engine 3, a traveling controller 12 that controls driving of the auxiliary equipment 4, a driving operation unit 11 on which an occupant performs a driving operation, a contactless charger 20 disposed within a vehicle cabin, a display panel 18 that is disposed within the vehicle cabin and that outputs information for the occupant, a device managing unit 16 that manages various devices such as accessory devices installed in the vehicle 1, a device operation unit 15 that can be operated by the occupant, and an acceleration sensor 19 that detects forward, backward, leftward, and rightward accelerations of the vehicle 1. The display panel 18 includes a charger working lamp 18a indicating that the contactless charger 20 is in a charging-capable state. The contactless charger 20 is provided with a working lamp 20a indicating the charging-capable state. The device operation unit 15 is a touch panel, for example, capable of receiving an operation for starting the contactless charger 20.

The driving operation unit 11 includes controls operated by the occupant, such as a steering wheel, an accelerator pedal, a brake pedal, and a shift lever. The driving operation unit 11 outputs a signal indicating a driving operation amount of each control to the traveling controller 12.

The traveling controller 12 controls traveling of the vehicle 1 by controlling, in accordance with a signal from the driving operation unit 11, the auxiliary equipment 4 and traveling mechanisms that are omitted from illustration (e.g., braking mechanism and steering mechanism). The auxiliary equipment 4 controls and changes power to be output from the engine 3. The traveling controller 12 may be constituted by a single electronic control unit (ECU) or a plurality of ECUs so as to work in cooperation via communication.

As illustrated in FIG. 1, the traveling controller 12 includes a traveling characteristics map data 31 and controls the traveling on the basis of the map data. For example, the traveling characteristics map data 31 includes map data for driving the engine 3, driving amount map data of a brake device relative to an operation amount of a brake pedal, and driving amount map data of a steering mechanism relative to an operation signal of a steering wheel. The map data for driving the engine 3 is, for example, map data indicating a fuel injection amount and an ignition-advance angle relative to an accelerator opening degree, which indicates a depression amount of an accelerator pedal, and engine rotational speed. The traveling characteristics map data 31 may also include data indicating a driving amount of the auxiliary equipment 4 and mechanisms in accordance with operation speed of the driving operation unit 11.

The traveling characteristics map data 31 may also include standard traveling characteristics map data with standard responsivity to an operation, speedy traveling characteristics map data with high responsivity to an operation, and gentle traveling characteristics map data with low responsivity to an operation. In addition, the traveling controller 12 may be configured to change traveling characteristics map data to be applied depending on an operation performed by an occupant, for example. The responsivity includes either or both of a response time and a response amount.

The traveling controller 12 further includes a light-load-area characteristics filter 32 and a heavy-load-area characteristics filter 33 for correcting values in the traveling characteristics map data. A characteristics filter is a functional module that is applied to any of the map data items in the traveling characteristics map data 31 to change the characteristics in a certain driving area to be steep or gentle, for example. The light-load-area characteristics filter 32 and the heavy-load-area characteristics filter 33 are applied if the contactless charger 20 is switched to a charging-capable state. Traveling characteristics before application of the light-load-area characteristics filter 32 and the heavy-load-area characteristics filter 33 correspond to an example of first traveling characteristics according to the embodiment of the disclosure, and traveling characteristics after application of the light-load-area characteristics filter 32 and the heavy-load-area characteristics filter 33 correspond to an example of second traveling characteristics according to the embodiment of the disclosure.

A driving operation correlates with a degree of gentleness of behavior of the vehicle 1. The light-load-area characteristics filter 32 changes the behavior of the vehicle 1 to be gentle in traveling characteristics in a driving operation area where the forward and backward accelerations generated in the vehicle 1 are low and a driving operation area where the leftward and rightward accelerations generated in the vehicle 1 are low. These driving operation areas are called "light-load area". The light-load area includes an area where an accelerator opening degree, a brake-pedal operation amount, a steering-wheel operation amount, or the like is small. The light-load area may further include an area where an accelerator-opening-degree change rate, a brake-pedal operation speed, a steering-wheel operation speed, or a composite amount of any of these rate or speeds and vehicle velocity is low. The light-load area corresponds to an example of a first area according to the embodiment of the disclosure.

The heavy-load-area characteristics filter 33 changes the behavior of the vehicle 1 to be gentle in traveling characteristics in a driving operation area where the forward and backward accelerations generated in the vehicle 1 are high and a driving operation area where the leftward and rightward accelerations generated in the vehicle 1 are high as compared with those in the driving operation areas of the light-load-area characteristics filter 32. These driving operation areas are called "heavy-load area". The heavy-load area includes an area where an accelerator opening degree, a brake-pedal operation amount, a steering-wheel operation amount, or the like is large as compared with that in the driving operation areas of the light-load-area characteristics filter 32. The heavy-load area may further include an area where an accelerator-opening-degree change rate, a brake-pedal operation speed, a steering-wheel operation speed, or a composite amount of any of these rate or speeds and vehicle velocity is high as compared with that in the driving operation areas of the light-load-area characteristics filter 32. The heavy-load area corresponds to an example of a second area according to the embodiment of the disclosure.

Figure 2:
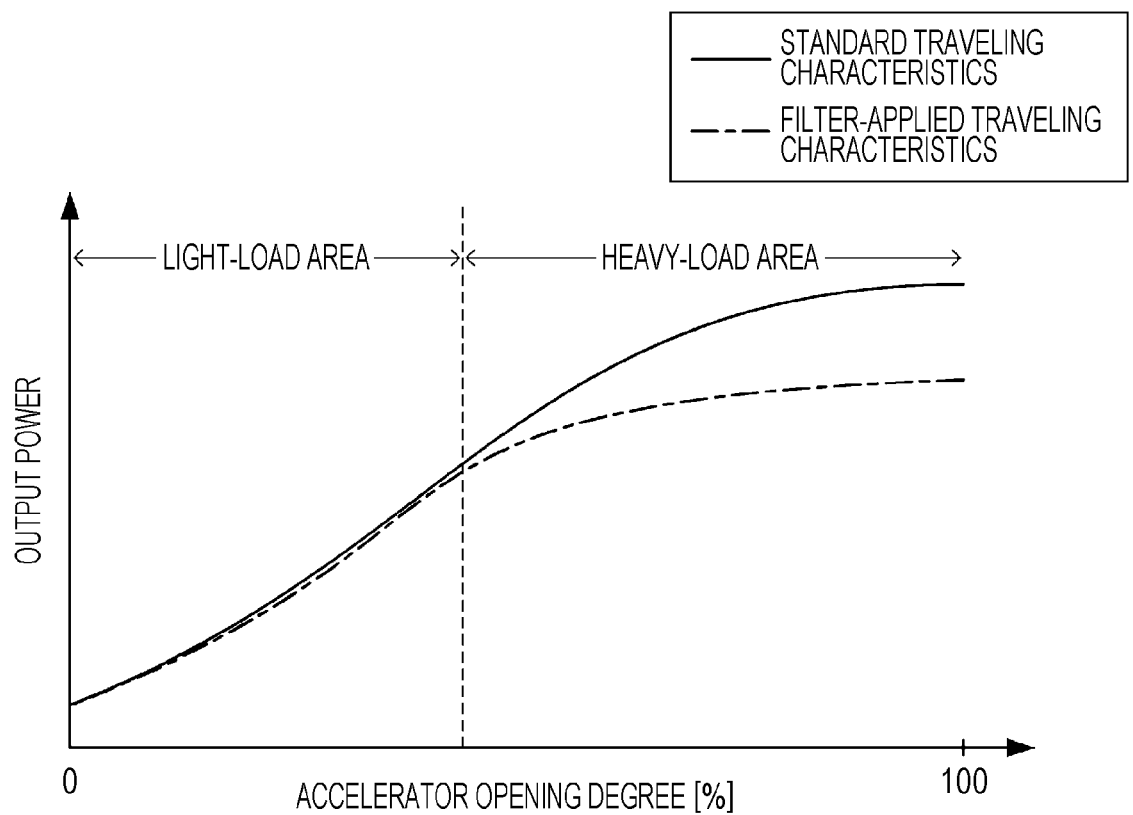
FIG. 2 illustrates examples of standard traveling characteristics and filter-applied traveling characteristics.

FIG. 2 is a characteristics diagram illustrating examples of standard traveling characteristics and filter-applied traveling characteristics. FIG. 2 illustrates a relationship between the accelerator opening degree and output power of the engine 3. In FIG. 2, the solid line represents standard traveling characteristics based on the standard traveling characteristics map data, and the dot-dash line represents traveling characteristics based on map data obtained by applying the light-load-area characteristics filter 32 and the heavy-load-area characteristics filter 33 to the standard traveling characteristics map data.

As illustrated in FIG. 2, the amount by which the light-load-area characteristics filter 32 reduces responsivity in traveling characteristics is smaller than the amount by which the heavy-load-area characteristics filter 33 reduces responsivity in traveling characteristics. In FIG. 2, as the reduction in responsivity, for example, reduction in output power that responds to the accelerator opening degree, that is, reduction in response amount is illustrated. The reduction in responsivity may also include increase in response time. The reduction in responsivity may be, in other words, reduction in acceleration generated in the vehicle 1 at the same vehicle velocity and with the same driving operation.

The light-load-area characteristics filter 32 and the heavy-load-area characteristics filter 33 may also include a characteristics filter that reduces forward and backward accelerations by braking and a characteristics filter that suppresses leftward and rightward accelerations by steering operation. By using these characteristics filters, also, the amount by which the heavy-load-area characteristics filter 33 reduces responsivity may be larger than the amount by which the light-load-area characteristics filter 32 reduces responsivity.

The contactless charger 20 includes a plate on which a mobile device is to be placed, a charging coil provided under the plate, and a detector that detects placement of a wirelessly chargeable mobile device on the plate. During the charging-capable state, if the mobile device is placed on the plate, the contactless charger 20 detects the placement and causes AC current to flow in the charging coil to perform wireless charging in accordance with a charging request from the mobile device. The plate has a larger area than the mobile device, and the charging coil generates magnetic flux in part of the area on the plate for wireless charging. The position where magnetic flux is generated is called "wireless charging position". The wireless charging position is resettable on the plate. The wireless charging position may be reset by, in a configuration in which a plurality of charging coils are provided at a plurality of positions under the plate, changing charging coils to be driven, or may be reset by displacing the charging coil by using a motor or the like.

The contactless charger 20 may have a searching function of, upon reception of data from the mobile device, searching for the wireless charging position at which a high charging efficiency can be obtained and generating magnetic flux from the found position for wireless charging. The contactless charger 20 may also have a function of, upon reception of a position reset signal indicating the direction and amount for resetting the wireless charging position from the device managing unit 16, resetting the wireless charging position in accordance with this signal.

There are a predetermined maximum static friction force and a dynamic friction force between the plate of the contactless charger 20 and the mobile device. The maximum static friction force (or static friction factor) and the dynamic friction force (or dynamic friction factor) are stored as control data in the device managing unit 16. If the friction forces differ largely depending on a mobile device owned by an occupant, the occupant may be asked to register data of the static friction force and the dynamic friction force in the device managing unit 16.

In a state where the mobile device is placed on the plate of the contactless charger 20, if the vehicle 1 travels with sudden acceleration, sudden deceleration, or sudden steering to generate an inertial force exceeding the static friction force in any of the forward, backward, leftward, and rightward directions, the mobile device slips on the plate. If the mobile device slips during wireless charging, the wireless charging position and the mobile device are misaligned, the power transmission efficiency is decreased, and the mobile device is not sufficiently charged against the occupant's intention in some cases. Alternatively, the decrease in the power transmission efficiency may cause the contactless charger 20 to search for the wireless charging position, and efficient charging may be started at an optimal wireless charging position in some cases. Even in such cases, however, if the mobile device slips a few times and the wireless charging position is searched for each time the mobile device slips, the searching time is increased and the charging time is decreased; thus, the mobile device is not sufficiently charged against the occupant's intention in some cases.

The device managing unit 16 controls driving of accessory devices upon reception of signals from the device operation unit 15 and manages power consumption or the like of the accessory devices. The control performed by the device managing unit 16 includes control for switching the contactless charger 20 between a non-working state and a charging-capable state and control for turning on or off the working lamp 20a of the contactless charger 20 and the charger working lamp 18a of the display panel 18. The device managing unit 16 may be constituted by a single ECU or a plurality of ECUs so as to work in cooperation via communication.

In order to charge the mobile device with the contactless charger 20, first, an occupant performs an operation on the device operation unit 15 for starting the contactless charger 20. Thus, the contactless charger 20 is switched to the charging-capable state, and the contactless charger 20 can use power supply of the vehicle 1. Even in the charging-capable state, unless a chargeable mobile device is placed on the plate, wireless charging is not performed. In the charging-capable state, if a chargeable mobile device is placed on the plate of the contactless charger 20, wireless charging is started. When the mobile device is fully charged, the contactless charger 20 stops wireless charging. However, even if wireless charging is stopped, the charging-capable state of the contactless charger 20 is not released. If wireless charging is not to be performed, the occupant may perform an operation on the device operation unit 15 for stopping using the contactless charger 20. This operation causes the device managing unit 16 to switch the contactless charger 20 to the non-working state. Thus, the contactless charger 20 transitions to a stop mode or a standby mode, and wireless charging is not performed even if a chargeable mobile device is placed on the plate of the contactless charger 20. The occupant can understand whether the contactless charger 20 is in the charging-capable state or the non-working state on the basis of the state of the charger working lamp 18a of the display panel 18 or the working lamp 20a of the contactless charger 20.

Control Process

Figure 3:
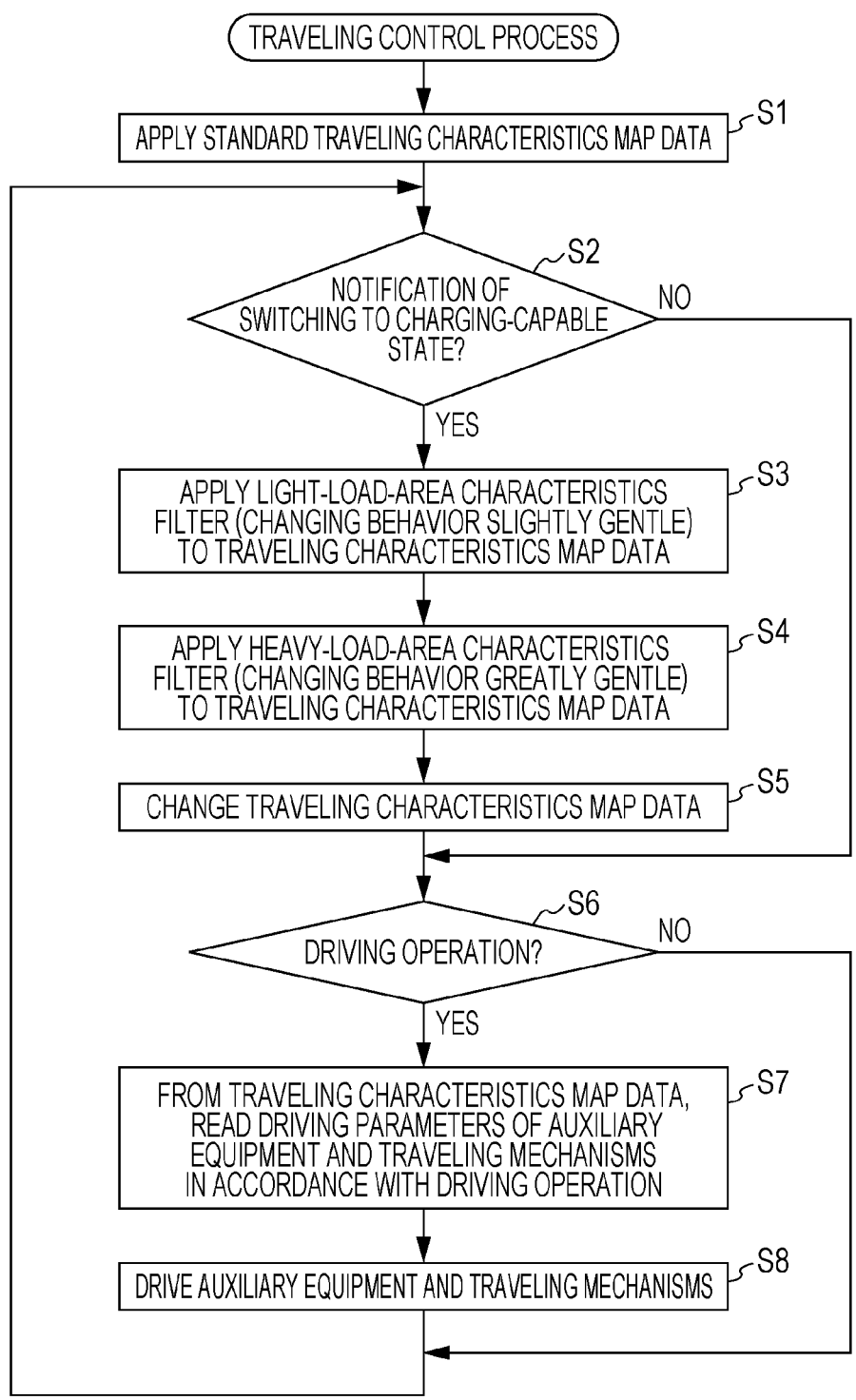
FIG. 3 is a flowchart illustrating a traveling control process performed by a traveling controller.

FIG. 3 is a flowchart illustrating a traveling control process performed by the traveling controller 12. FIG. 4 is a flowchart illustrating a device management process performed by the device managing unit 16. The traveling control process in FIG. 3 and the device management process in FIG. 4 start at the time a system of the vehicle 1 is started and then are performed continuously and repeatedly by the traveling controller 12 and the device managing unit 16.

During the device management process (FIG. 4), the process is performed in accordance with conditions, such as content of operation performed by an occupant on the device operation unit 15 and particular behavior of the vehicle 1 (e.g., increased acceleration). The device management process (FIG. 4) includes loop processes for determining the conditions (e.g., step S11 and step S22) and execution processes in accordance with the conditions (e.g., steps S12 to S14 and steps S23 and S24). The device management process further includes a process (step S21) in which the device managing unit 16 samples data output from the acceleration sensor 19 at a predetermined cycle and stores acceleration data of a predetermined period.

During a loop process in the device management process, the device managing unit 16 determines whether the occupant performs an operation for starting the contactless charger 20 (step S11). As a result of determination, if the operation is not performed, the device managing unit 16 proceeds to the next condition determination; if the operation is performed, the device managing unit 16 turns on a working lamp (the charger working lamp 18a and the working lamp 20a) of the contactless charger 20 (step S12). Subsequently, the device managing unit 16 switches the contactless charger 20 to the charging-capable state (step S13), and notifies the traveling controller 12 of switching to the charging-capable state (step S14). Subsequently, the device managing unit 16 proceeds to the next condition determination. The order of steps S12 to S14 is changeable.

At the time of start of the traveling control process (FIG. 3), the traveling controller 12 applies the standard traveling characteristics map data, for example, as initial map data to be used for traveling control (step S1) and then proceeds to the following loop process (steps S2 to S8).

During the loop process, the traveling controller 12 determines whether there is a notification of switching the contactless charger 20 to the charging-capable state from the device managing unit 16 (step S2) and, if there is no notification, determines whether there is a driving operation signal from the driving operation unit 11 (step S6).

If a driving operation is performed and determination in step S6 is YES, the traveling controller 12 reads from the currently applied traveling characteristics map data, driving parameters for the auxiliary equipment 4 or traveling mechanisms (e.g., braking mechanism and steering mechanism) in accordance with the driving operation (step S7). Subsequently, by using the read driving parameters, the traveling controller 12 drives the auxiliary equipment 4 or traveling mechanisms (step S8). Since such process (steps S6 to S8) in accordance with the driving operation is repeatedly performed, the vehicle 1 can travel in accordance with the driving operation and the traveling characteristics map data.

If there is a notification of switching to the charging-capable state from the device managing unit 16 (YES in step S2), the traveling controller 12 applies the light-load-area characteristics filter 32 to the currently applied traveling characteristics map data (e.g., the standard traveling characteristics map data) (step S3). The light-load-area characteristics filter 32 is applied to map data in the driving operation area in which high acceleration is not to be generated in the vehicle 1 and changes the behavior of the vehicle 1 generated in accordance with the driving operation to be gentle. Subsequently, the traveling controller 12 applies the heavy-load-area characteristics filter 33 to the currently applied traveling characteristics map data (e.g., the standard traveling characteristics map data) (step S4). The heavy-load-area characteristics filter 33 is applied to map data in the driving operation area in which high acceleration is to be generated in the vehicle 1 and changes the behavior of the vehicle 1 generated in accordance with the driving operation to be gentle. The behavior of the vehicle 1 is made gentler by the heavy-load-area characteristics filter 33 than by the light-load-area characteristics filter 32.

Subsequently, the traveling controller 12 updates the traveling characteristics map data to be used for traveling control and changes from the last traveling characteristics map data to new traveling characteristics map data obtained by the application in steps S3 and S4 (step S5). After this update step, when the driving parameters are read in step S7, the new traveling characteristics map data is used. With this change, as illustrated in FIG. 4, for example, the output power of the engine 3 relative to the accelerator opening degree is changed to be slightly gentle in an area where the depression amount of the accelerator pedal is small and is changed to be greatly gentle in an area where the depression amount of the accelerator pedal is large. Similarly, as for characteristics of a braking force relative to the depression amount of the brake pedal, characteristics of a steering-angle change amount or the like relative to the operation amount or operation speed of the steering wheel, traveling characteristics are changed to be slightly gentle in an area where low acceleration is generated in the vehicle 1 and are changed to be greatly gentle in an area where high acceleration is generated in the vehicle 1.

If the contactless charger 20 is switched to the charging-capable state in response to an operation performed by an occupant, the contactless charger 20 is assumed to be used later to charge a mobile device. Thus, by changing the traveling characteristics in the above manner on the basis of a notification of switching to the charging-capable state, the behavior of the vehicle 1 while the mobile device is being charged is changed to be gentle. Thus, it is unlikely that the mobile device slips on the plate of the contactless charger 20. Note that if the depression amount of the accelerator pedal or the depression amount of the brake pedal exceeds a threshold (e.g., 90%) that is close to a maximum, the characteristics filter for changing the behavior of the vehicle 1 to be gentle may be released so that the driver's intention on the driving operation can have priority.

If there is a notification of switching the contactless charger 20 from the charging-capable state to the non-working state from the device managing unit 16, the traveling controller 12 may perform control for restoring the traveling characteristics map data.

In the loop process in the device management process (FIG. 4), on the basis of output from the acceleration sensor 19, the device managing unit 16 determines whether the acceleration of the vehicle 1 (forward, backward, leftward, and rightward composite acceleration) is higher than or equal to a predetermined threshold (step S22). For example, the threshold is set to a value corresponding to a maximum static friction force generated on a surface where the contactless charger 20 and the mobile device are in contact with each other. If an inertial force applied to the mobile device by the behavior of the vehicle 1 exceeds the static friction force to make the mobile device slip on the plate of the contactless charger 20, the determination in step S22 is YES.

Note that the determination in step S22 as to whether the mobile device slips on the plate of the contactless charger 20 may be performed on the basis of, instead of output from the acceleration sensor 19, determination performed by the device managing unit 16 as to whether charging efficiency of the contactless charger 20 is decreased (e.g., whether the charging efficiency is decreased to 80% or less). This determination may be performed by calculating, by the contactless charger 20, the charging efficiency on the basis of data received from the mobile device and notifying the device managing unit 16 of the calculation result, or by determining, by the contactless charger 20, decrease in charging efficiency on the basis of the calculation result and notifying the device managing unit 16 of the determination result. Furthermore, the determination in step S22 as to whether the mobile device slips on the plate of the contactless charger 20 may be performed by capturing an image on the plate with a camera and analyzing the image, or by identifying the position of the mobile device from a signal output from the mobile device.

If the determination in step S22 is YES, that is, if it is determined that the mobile device slips on the plate of the contactless charger 20, by using acceleration data that is sampled and stored during a predetermined period (from a previous time point to a current time point), the device managing unit 16 estimates the direction and amount of shift of the mobile device (step S23). Step S23 corresponds to an example of a function of an estimation unit according to the embodiment of the disclosure. Subsequently, the device managing unit 16 outputs a position reset signal to the contactless charger 20 together with data of the estimated shift direction and amount and requests reset of the wireless charging position (step S24). Subsequently, the device managing unit 16 returns to the loop process for condition determination again.

Upon reception of the position reset signal in step S24, the contactless charger 20 performs a process for resetting the wireless charging position. By using the estimated shift-related values received from the device managing unit 16, the contactless charger 20 can search for an optimal wireless charging position and can correct the wireless charging position quickly as compared with a case in which no information is used. Thus, even if the mobile device slips on the plate of the contactless charger 20 a few times, the time for searching for the mobile device can be shortened, and it is likely to obtain a sufficient time for charging the mobile device.

Process for Estimating Shift of Mobile Device

Figure 5A:
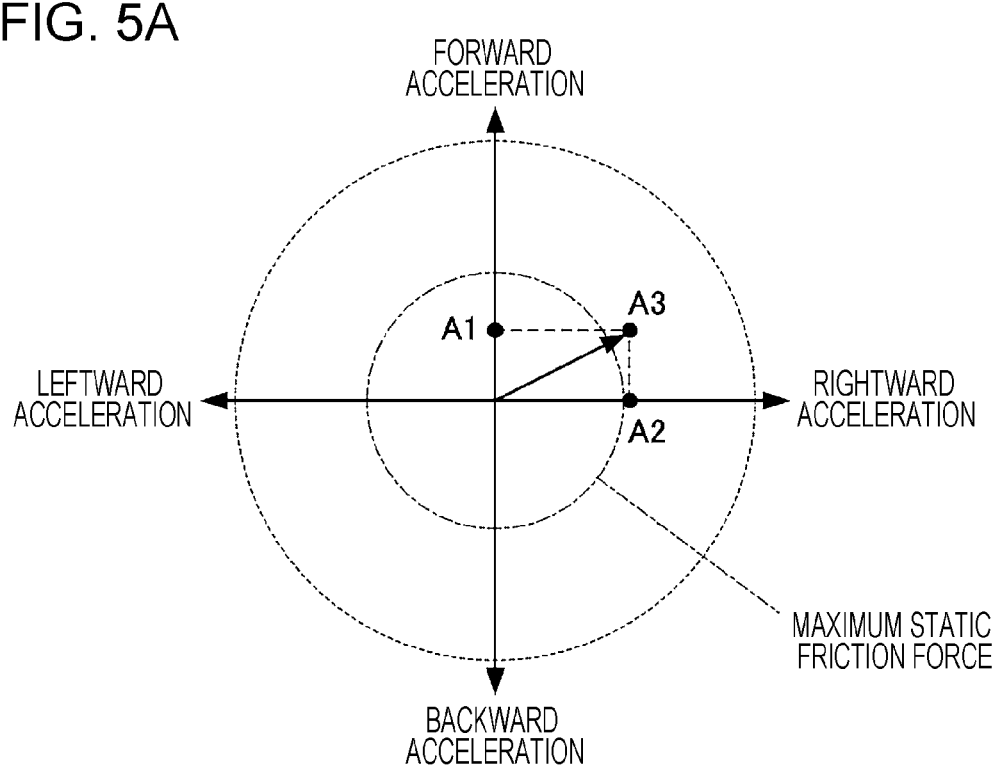
FIGS. 5A and 5B illustrate an estimation process regarding shift of a mobile device and a reset process of a wireless charging position, where
Figure 5B:
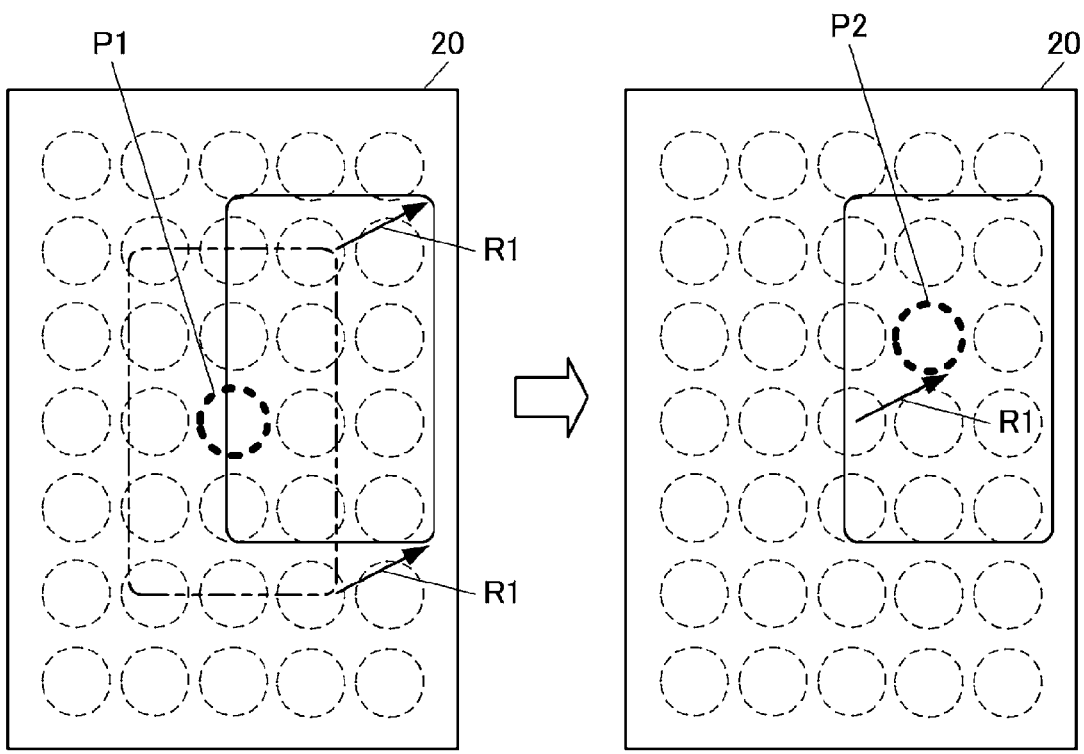

Next, a specific example of the estimation process regarding shift of the mobile device in step S23 will be described. FIGS. 5A and 5B illustrate the estimation process regarding shift of the mobile device and the reset process of the wireless charging position, where FIG. 5A illustrates an example of acceleration data and FIG. 5B illustrates an example of resetting a charging position corresponding to shift of the mobile device.

As illustrated in FIG. 5A, the acceleration sensor 19 outputs data of front-back direction acceleration A1 and data of left-right direction acceleration A2. For example, the backward acceleration is increased at the time of accelerating the vehicle 1, the forward acceleration is increased at the time of decelerating the vehicle 1, and the leftward or rightward acceleration is increased at the time of sudden steering. These data items are transmitted to the device managing unit 16.

On the basis of signals from the acceleration sensor 19, the device managing unit 16 calculates acceleration A3 by combining the front-back direction acceleration A1 and the left-right direction acceleration A2. If an inertial force generated by the acceleration A3 exceeds the maximum static friction force between the plate and the mobile device, the device managing unit 16 determines that the mobile device slips (step S22). Furthermore, the device managing unit 16 extracts the acceleration A3 during a period after the inertial force generated by the acceleration A3 has exceeded the maximum static friction force until becoming lower than or equal to the dynamic friction force, calculates an amount by subtracting resistance by the dynamic friction force from the extracted acceleration A3, estimates the track of the mobile device from this data and the size of the plate, and calculates vector R1 (FIG. 5B) representing shift (final position) of the mobile device (step S23).

The contactless charger 20 can apply the vector R1 to a before-shift wireless charging position P1 to find an after-shift wireless charging position P2 (FIG. 5B) quickly.

As described above, with the vehicle 1 according to the embodiment, if the contactless charger 20 is switched to the charging-capable state, the traveling controller 12 applies the light-load-area characteristics filter 32 and the heavy-load-area characteristics filter 33 to change traveling characteristics in which the behavior of the vehicle 1 is gentle. This can suppress sudden behavior of the vehicle 1 when an occupant uses the contactless charger 20 later for wireless charging of a mobile device. Thus, it is unlikely that the mobile device slips on the plate of the contactless charger 20, encouraging smooth wireless charging. Furthermore, with the vehicle 1 according to the embodiment, since the traveling characteristics are changed on the basis of switching the contactless charger 20 to the charging-capable state, for example, as compared with a case in which the traveling characteristics are changed on the basis of other conditions, such as whether wireless charging is being performed, an occupant can easily understand when the traveling characteristics are changed, reducing a feeling of strangeness that the occupant has due to the change of the traveling characteristics.

Note that the embodiment has described a case in which the traveling characteristics are changed on the basis of switching the contactless charger 20 to the charging-capable state by applying characteristics filters. However, the traveling characteristics may be changed by preparing traveling characteristics map data in advance for changing the behavior of the vehicle 1 to be gentle and applying this map data. The traveling characteristics map data may be dedicated data applied when switching the contactless charger 20 to the charging-capable state or may be traveling characteristics map data of a gentle-behavior traveling mode among traveling modes stored in the vehicle 1 in advance, such as sport mode capable of speedy behavior and intelligent mode capable of gentle behavior. In addition, the traveling characteristics may be changed when traveling characteristics with high responsivity or traveling characteristics with standard responsivity are applied and may not be changed when traveling characteristics with gentle behavior of the vehicle 1 is already applied.

In addition, with the vehicle 1 according to the embodiment, on the basis of switching the contactless charger 20 to the charging-capable state by an occupant operating the device operation unit 15, the traveling controller 12 changes the traveling characteristics. Thus, since the traveling characteristics are changed as a result of the occupant's operation, the occupant can easily understand when the traveling characteristics are changed, reducing a feeling of strangeness that the occupant has due to the change of the traveling characteristics.

Furthermore, with the vehicle 1 according to the embodiment, if the contactless charger 20 is switched to the charging-capable state, the traveling controller 12 changes the traveling characteristics in synchronization with the device managing unit 16 outputting a signal (corresponding to an example of a notification signal according to the embodiment of the disclosure) for turning on the charger working lamp 18a and the working lamp 20a. Thus, the occupant can also understand that the traveling characteristics are changed on the basis of turning on of the charger working lamp 18a and the working lamp 20a, further reducing a feeling of strangeness that the occupant has due to the change of the traveling characteristics. In addition, a traveling mode displayed on a meter panel or the like may be changed so that a driver can be notified of the change of the traveling characteristics. Note that in a case where a traveling mode with gentle behavior is already used when the contactless charger 20 is switched to the charging-capable state, and the traveling mode is not to be changed, the driver may not be notified of the change. In addition, if the driver requests change to a highly responsive traveling mode while the contactless charger 20 is in the charging-capable state, the traveling controller 12 may reject this request and may notify the driver of rejection of the request by outputting a notification sound or displaying a notification.

Furthermore, with the vehicle 1 according to the embodiment, upon switching the contactless charger 20 to the charging-capable state, regardless of whether the contactless charger 20 is performing charging, the traveling controller 12 changes the traveling characteristics. In a case in which the traveling characteristics are changed on the basis of whether the contactless charger 20 is performing charging, for example, the traveling characteristics are changed also when charging is stopped because of full-charging and when charging is stopped or restarted due to shift of the mobile device, and an occupant is likely to have a feeling of strangeness. However, the above configuration can remove such a feeling of strangeness.

Furthermore, with the vehicle 1 according to the embodiment, in a case in which the traveling characteristics are changed by switching the contactless charger 20 to the charging-capable state, differences in traveling characteristics in the heavy-load area are larger than differences in traveling characteristics in the light-load area before and after the change. Such change of the traveling characteristics can efficiently suppress such behavior of the vehicle 1 as to hinder wireless charging due to slip of the mobile device, and can control the other behavior of the vehicle 1 not to change largely.

Furthermore, with the vehicle 1 according to the embodiment, in a case in which the mobile device slips on the plate of the contactless charger 20 as a result of high acceleration generated in the vehicle 1, the device managing unit 16 outputs a position reset signal to the contactless charger 20. Thus, if the charging efficiency is decreased by slip of the mobile device, the contactless charger 20 can correct the wireless charging position quickly.

Furthermore, with the vehicle 1 according to the embodiment, the device managing unit 16 estimates shift of the mobile device on the basis of acceleration of the vehicle 1 and transmits the estimation result in the position reset signal to the contactless charger 20. Accordingly, if the charging efficiency is decreased by slip of the mobile device, the contactless charger 20 can correct the wireless charging position more quickly than in a case of performing a typical position searching process. Thus, even if the mobile device slips on the plate of the contactless charger 20 a few times, the time for searching for the mobile device can be shortened, and it is likely to obtain a sufficient time for charging the mobile device.

The embodiment of the disclosure has been described above. However, the disclosure is not limited to the above embodiment. For example, the embodiment has described a case in which the steps are performed in the following order: an operation for starting the contactless charger 20 by an occupant; switching the contactless charger 20 to the charging-capable state by the device managing unit 16; and changing the traveling characteristics to the second traveling characteristics by the traveling controller 12. However, unless there is a long duration between the switching of the contactless charger 20 to the charging-capable state and the changing of the traveling characteristics to the second traveling characteristics, it is also possible to perform the steps in the following order: the operation for starting the contactless charger 20 by an occupant; the changing of the traveling characteristics to the second traveling characteristics by the traveling controller 12; and the switching of the contactless charger 20 to the charging-capable state by the device managing unit 16. In addition, the above embodiment has described that all the traveling characteristics regarding three driving operations, which are acceleration propulsion, braking, and steering, are changed. However, traveling characteristics regarding any one or two of these driving operations may be changed. Alternatively, if another driving operation that correlates with a degree of gentleness of behavior of the vehicle 1 is introduced, the traveling characteristics regarding the driving operation may be changed to be gentle. Furthermore, the traveling characteristics may be changed with respect to a driving operation of autonomous driving, regardless of an occupant's driving operation. In addition, although the above embodiment has described a vehicle in which a contactless charger is installed, the vehicle according to the embodiment of the disclosure includes a vehicle in which a contactless charger is not installed yet and is optionally installable. Furthermore, the above embodiment has described a traveling controller and a device managing unit as separate components. However, for example, a single ECU may have functions of the traveling controller and functions of the device managing unit, or a plurality of ECUs that work in cooperation via communication may have a plurality of functions of the traveling controller and a plurality of functions of the device managing unit in a dispersed manner. Other details illustrated in the embodiment may be modified as appropriate without departing from the spirit of the disclosure.

The traveling controller 12 and the device managing unit 16 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling controller 12 and the device managing unit 16, the traveling controller 12 including the traveling characteristics map data 31, the light-load-area characteristics filter 32, and the heavy-load-area characteristics filter 33. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle in which a contactless charger is installable, the contactless charger being capable of performing wireless charging of a mobile device, the vehicle comprising:
a traveling controller configured to control traveling of the vehicle by performing at least traveling control of first traveling characteristics and traveling control of second traveling characteristics, the second traveling characteristics being traveling characteristics in which behavior of the vehicle is gentler than that in the first traveling characteristics; and
a device managing unit configured to switch the contactless charger between a charging-capable state capable to charge the mobile device by using a power supply of the vehicle and a non-working state,
wherein, when receiving, from the device managing unit, notification that the device managing unit switches the contactless charger to the charging-capable state, the traveling controller changes traveling characteristics to the second traveling characteristics.

2. The vehicle according to claim 1, further comprising:
a device operation unit configured to be operated by an occupant, wherein
when the device managing unit switches the contactless charger to the charging-capable state in response to an operation on the device operation unit performed by an occupant, the traveling controller changes the traveling characteristics.

3. The vehicle according to claim 1, wherein
the device managing unit is further configured to output a notification signal for notifying an occupant that the contactless charger is in the charging-capable state, and
in synchronization with output of the notification signal, the traveling controller changes the traveling characteristics.

4. The vehicle according to claim 2, wherein
the device managing unit is further configured to output a notification signal for notifying an occupant that the contactless charger is in the charging-capable state, and in synchronization with output of the notification signal, the traveling controller changes the traveling characteristics.

5. The vehicle according to claim 1, wherein
regardless of whether the contactless charger is performing charging, the traveling controller changes the traveling characteristics when the contactless charger is switched to the charging-capable state.

6. The vehicle according to claim 2, wherein
regardless of whether the contactless charger is performing charging, the traveling controller changes the traveling characteristics when the contactless charger is switched to the charging-capable state.

7. The vehicle according to claim 3, wherein
regardless of whether the contactless charger is performing charging, the traveling controller changes the traveling characteristics when the contactless charger is switched to the charging-capable state.

8. The vehicle according to claim 4, wherein
regardless of whether the contactless charger is performing charging, the traveling controller changes the traveling characteristics when the contactless charger is switched to the charging-capable state.

9. The vehicle according to claim 1, wherein
a difference in responsivity between the first traveling characteristics and the second traveling characteristics in a second area is larger than a difference in responsivity between the first traveling characteristics and the second traveling characteristics in a first area, the responsivity being responsivity to a driving operation that correlates with a degree of gentleness of the behavior of the vehicle, the behavior of the vehicle to be generated being more sudden in the second area than that in the first area.

10. The vehicle according to claim 2, wherein
a difference in responsivity between the first traveling characteristics and the second traveling characteristics in a second area is larger than a difference in responsivity between the first traveling characteristics and the second traveling characteristics in a first area, the responsivity being responsivity to a driving operation that correlates with a degree of gentleness of the behavior of the vehicle, the behavior of the vehicle to be generated being more sudden in the second area than that in the first area.

11. The vehicle according to claim 3, wherein
a difference in responsivity between the first traveling characteristics and the second traveling characteristics in a second area is larger than a difference in responsivity between the first traveling characteristics and the second traveling characteristics in a first area, the responsivity being responsivity to a driving operation that correlates with a degree of gentleness of the behavior of the vehicle, the behavior of the vehicle to be generated being more sudden in the second area than that in the first area.

12. The vehicle according to claim 4, wherein
a difference in responsivity between the first traveling characteristics and the second traveling characteristics in a second area is larger than a difference in responsivity between the first traveling characteristics and the second traveling characteristics in a first area, the responsivity being responsivity to a driving operation that correlates with a degree of gentleness of the behavior of the vehicle, the behavior of the vehicle to be generated being more sudden in the second area than that in the first area.

13. The vehicle according to claim 1, wherein
the device managing unit is further configured to output a position reset signal for requesting the contactless charger to reset a charging position, and
if an acceleration exceeding a threshold is generated in the vehicle, the device managing unit outputs the position reset signal in accordance with the acceleration.

14. The vehicle according to claim 2, wherein
the device managing unit is further configured to output a position reset signal for requesting the contactless charger to reset a charging position, and
if an acceleration exceeding a threshold is generated in the vehicle, the device managing unit outputs the position reset signal in accordance with the acceleration.

15. The vehicle according to claim 3, wherein
the device managing unit is further configured to output a position reset signal for requesting the contactless charger to reset a charging position, and
if an acceleration exceeding a threshold is generated in the vehicle, the device managing unit outputs the position reset signal in accordance with the acceleration.

16. The vehicle according to claim 4, wherein
the device managing unit is further configured to output a position reset signal for requesting the contactless charger to reset a charging position, and
if an acceleration exceeding a threshold is generated in the vehicle, the device managing unit outputs the position reset signal in accordance with the acceleration.

17. The vehicle according to claim 13, wherein
the device managing unit includes an estimation unit configured to estimate, on a basis of the acceleration of the vehicle, a slip direction and a slip amount of the mobile device on a plate of the contactless charger, and
the position reset signal includes an estimation result obtained by the estimation unit.

18. The vehicle according to claim 1, wherein the contactless charger comprises a plurality of wireless charging positions, and
wherein one of the plurality of charging positions is set to the charging-capable state simultaneously with a second of the plurality of charging positions set to the non-working state.

19. The vehicle according to claim 1, wherein the contactless charger comprises a plurality of wireless charging positions, and
wherein the contactless charger comprises a plate that has the plurality of wireless charging positions disposed evenly thereon across the plate.

20. A vehicle in which a contactless charger is installable, the contactless charger being capable of performing wireless charging of a mobile device, the vehicle comprising:
circuitry configured to
control traveling of the vehicle by performing at least traveling control of first traveling characteristics and traveling control of second traveling characteristics, the second traveling characteristics being traveling characteristics in which behavior of the vehicle is gentler than that in the first traveling characteristics,
switch the contactless charger between a charging-capable state capable to charge the mobile device by using a power supply of the vehicle and a non-working state, and
change traveling characteristics to the second traveling characteristics when receiving, from the device managing unit, notification that the contactless charger is switched to the charging-capable state.

\* \* \* \* \*